US009494331B2

(12) United States Patent
Jensen

(10) Patent No.: US 9,494,331 B2
(45) Date of Patent: Nov. 15, 2016

(54) VENTILATION SYSTEM WITH A ROTATABLE AIR FLOW GENERATOR AND ONE OR MORE MOVABLE REGISTERS AND METHOD FOR OBTAINING VENTILATION THROUGH THE VENTILATION SYSTEM

(75) Inventor: John Borsting Jensen, Struer (DK)

(73) Assignee: InVentilate Holdings ApS (DK)

( * ) Notice: Subject to any disclaimer, the term of this patent is extended or adjusted under 35 U.S.C. 154(b) by 374 days.

(21) Appl. No.: 14/117,468

(22) PCT Filed: May 11, 2012

(86) PCT No.: PCT/DK2012/050161
§ 371 (c)(1),
(2), (4) Date: Nov. 13, 2013

(87) PCT Pub. No.: WO2012/155913
PCT Pub. Date: Nov. 22, 2012

(65) Prior Publication Data
US 2014/0273797 A1  Sep. 18, 2014

(30) Foreign Application Priority Data

May 13, 2011 (DK) .................................. 2011 70236

(51) Int. Cl.
| F24F 7/06 | (2006.01) |
| F24F 13/14 | (2006.01) |
| F24F 7/00 | (2006.01) |
| F24F 12/00 | (2006.01) |

(52) U.S. Cl.
CPC .............. *F24F 7/065* (2013.01); *F24F 13/14* (2013.01); *F24F 2007/005* (2013.01); *F24F 2012/008* (2013.01); *Y02B 30/563* (2013.01)

(58) Field of Classification Search
CPC .............. F24F 7/065; F24F 2007/005; F24F 2012/008; F24F 7/06; F24F 13/10; F04D 19/005; F04D 29/524; F04D 29/563; F04D 25/10; F04D 25/105

USPC ...... 415/148, 149.2, 149.3, 151, 159, 182.1, 415/126, 129; 416/244 R, 246; 137/902; 165/97

See application file for complete search history.

(56) References Cited

U.S. PATENT DOCUMENTS

| 1,972,780 A | * | 9/1934 | Laskowitz | ............ F04D 19/005 |
| | | | | 415/122.1 |
| 3,736,858 A | * | 6/1973 | Mercier | ................. B60H 1/345 |
| | | | | 454/286 |

(Continued)

FOREIGN PATENT DOCUMENTS

| CA | 2092727 A1 | 9/1994 |
| CN | 2703224 Y | 6/2005 |

(Continued)

*Primary Examiner* — Steven B McAllister
*Assistant Examiner* — Ko-Wei Lin
(74) *Attorney, Agent, or Firm* — St. Onge Steward Johnston and Reens, LLC

(57) ABSTRACT

A ventilation system (1) for air ventilation is disclosed, comprising a continuous duct (5) having openings at both ends, an air flow generator (2) arranged inside the duct to be rotatable around an axis of rotation so that, positioned in different rotational positions, the air flow generator is capable of producing a substantially axial air flow in each of the two directions through the duct, respectively, one or more registers arranged to be moveable between different positions, in at least one of which positions the one or more registers (6) leave the duct (5) open for air passage, whereas in another of the positions the one or more registers (6) substantially block the air passage through the duct (5), means for rotating the air flow generator (2), and means for moving the one or more registers. Furthermore, methods for controlled active and passive ventilation, respectively, through the duct of such a ventilation system (1) are disclosed.

15 Claims, 4 Drawing Sheets

(56) References Cited

Figure 1A:
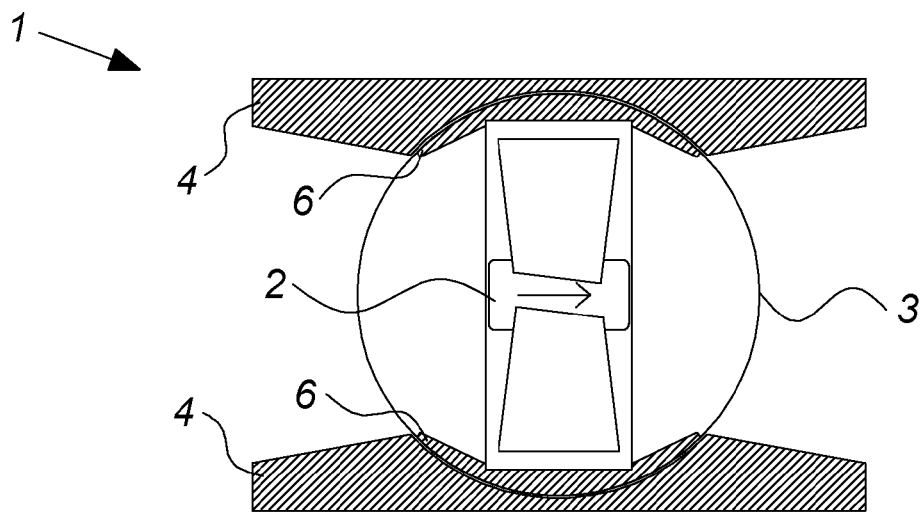

U.S. PATENT DOCUMENTS 4,013,264 A * 3/1977 Friedell .................. F16K 5/061
 251/129.11
5,230,719 A * 7/1993 Berner .................. F24F 3/1411
 165/4

FOREIGN PATENT DOCUMENTS

| DE | 3438973 A1 | 5/1985 |
| DE | 4115710 A1 | 4/1992 |
| DE | 4104423 A1 | 8/1992 |
| GB | 2244127 A | 11/1991 |

* cited by examiner

VENTILATION SYSTEM WITH A ROTATABLE AIR FLOW GENERATOR AND ONE OR MORE MOVABLE REGISTERS AND METHOD FOR OBTAINING VENTILATION THROUGH THE VENTILATION SYSTEM

FIELD OF THE INVENTION

The present invention relates to a ventilation system for air ventilation.

BACKGROUND OF THE INVENTION

Some ventilation systems, such as heat recovery systems in which heat energy is extracted from an air flow leaving an enclosure, such as a building, stored and added to another air flow entering the enclosure at a later point of time, require that appropriate air flows can be generated in two opposite directions.

The typical solution to this problem is to provide the ventilation system with two or more air flow generators, which are oppositely oriented so that one or more air flow generators are used for generating air flows in one direction and one or more other air flow generators are used for generating air flows in the opposite direction.

Some solutions trying to save space and reduce costs include the use of a system of registers, which can be placed in different positions for directing the air flow through the ventilation system in one direction or the other while still passing through or by the air flow generator in the same direction. However, such register systems may be rather complicated and they are often not very stable and reliable as seen from a mechanically point of view.

Other solutions include the use of air flow generators which are able to generate air flows in two opposite directions, although not at the same time. However, such air flow generators typically have a primary and a secondary air flow direction, and the energy consumption for generating an air flow in the secondary direction may be twice as high as the energy consumption for generating a similar air flow in the primary direction. If the air flow generator is constructed to be "symmetric", when it comes to generating air flows in the two directions, the efficiency of the air flow generator is typically rather poor in both directions.

Another problem of heat recovery systems known in the art is that the wind may force air inwards through the system, thus creating an air flow through the system, even in the opposite direction of the working direction of a weak air flow generator, if the pressure exerted by the wind exceeds the maximum possible working pressure of the air flow generator.

For this reason, some systems are provided with an inside register, which may be closed manually by a person, if the nuisances from the draught through the system become too severe.

It is an object of the present invention to provide a ventilation system, which overcomes the above-mentioned disadvantages of the systems known in the art.

BRIEF DESCRIPTION OF THE INVENTION

The present invention relates to a ventilation system for air ventilation comprising a continuous duct having openings at both ends, an air flow generator arranged inside the duct to be rotatable around an axis of rotation so that, positioned in different rotational positions, the air flow generator is capable of producing a substantially axial air flow in each of the two directions through the duct, respectively, one or more registers arranged to be moveable between different positions, in at least one of which positions the one or more registers leave the duct open for air passage, whereas in another of the positions the one or more registers substantially block the air passage through the duct, means for rotating the air flow generator, and means for moving the one or more registers.

Such a configuration allows for a very compact and at the same time very flexible ventilation system.

It should be emphasised that by the term "air flow generator" is to be understood any kind of component or device capable of actively generating an air flow such as an axial fan, radial fan, diagonal fan, tangential blower, displacement pump or other.

In an embodiment of the invention, the one or more registers further can be moved into positions, in which the air passage through the duct is partly blocked.

The possibility for moving the registers to positions, in which the air passage is partly blocked allows for controlled passive ventilation as described further below.

In an embodiment of the invention, the axis of rotation of the air flow generator is substantially perpendicular to a longitudinal axis of the duct.

For production and space-saving purposes, the axis of rotation is advantageously chosen to be perpendicular to the longitudinal axis of the duct.

In an embodiment of the invention, the ventilation system further comprises means for simultaneously rotating the air flow generator and moving the one or more registers.

In a further embodiment of the invention, the rotational position of the air flow generator and the positions of the one or more registers are connected in a one-to-one relationship so that, when the air flow generator is in any given rotational position, the one or more registers are in positions associated with that specific rotational position of the air flow generator.

Rotating the air flow generator and moving the one or more registers simultaneously and, especially, making sure that when the air flow generator is in a given rotational position, the one or more registers are always in the same positions, allows for a safer and more reproducible control of the ventilation system.

In an embodiment of the invention, when the air flow generator is in a rotational position, in which it produces a substantially axial air flow through the duct, the one or more registers are in positions leaving the air passage substantially fully open.

It should be emphasised that by the term "substantially fully open" is to be understood that the smallest cross-sectional area of the air passage is close to its maximum possible value, such as for instance more than 80% thereof, preferably more than 95% thereof.

In an embodiment of the invention, when the air flow generator is in a rotational position perpendicular to the ones, in which it produces a substantially axial air flow through the duct, the one or more registers are in positions, in which the air passage through the duct is substantially blocked.

Combining the rotational position of the air flow generator and the positions of the one or more registers as described above assures that the maximum possible air flow as well as no air flow at all through the continuous duct can be obtained.

In an embodiment of the invention, the positioning of the one or more registers is stepless.

Stepless positioning of the one or more registers allows for controlled stepless passive ventilation as described further below.

In an embodiment of the invention, the one or more registers comprise one or more barrier plates, which are physically connected to the air flow generator so that they perform a rotational motion when the air flow generator is rotated.

Such a configuration ensures a mechanically simple and reliable embodiment of the ventilation system.

In an embodiment of the invention, the ventilation system further comprises a heat storage.

By incorporating a heat storage in the ventilation system, it is obtained that the ventilation system can be used for heat regeneration.

In an embodiment of the invention, the ventilation system further comprises means for controlling the power output of a motor driving the air flow generator.

Being able to control the power output of a motor driving the air flow generator allows for controlled active ventilation as described further below.

In an aspect of the invention, it relates to a method for obtaining controlled active ventilation through the duct of a ventilation system as described above, said method comprising the steps of:

- positioning the air flow generator in a rotational position, in which it produces a substantially axial air flow through the duct, and the one or more registers in positions, in which the air passage through the duct is left substantially fully open, and
- controlling the output of the motor driving the air flow generator so as to obtain the desired ventilation effect.

In this way, controlled active ventilation can be obtained in the sense that the air flow generator is running (i.e. active), while the ventilation takes place, the air flow through the duct being produced by the air flow generator.

In another aspect of the invention, it relates to a method for obtaining controlled passive ventilation through the duct of a ventilation system as described above, said method comprising the steps of:

- switching off the air flow generator,
- controlling the positions of the one or more registers, thereby controlling the opening of the air passage through the duct, so as to obtain the desired ventilation effect.

In this way, controlled passive ventilation can be obtained in the sense that the air flow generator is switched off (i.e. passive), while the ventilation takes place, the natural air flow through the duct being controlled by the positions of the one or more registers.

FIGURES

Figure 1B:
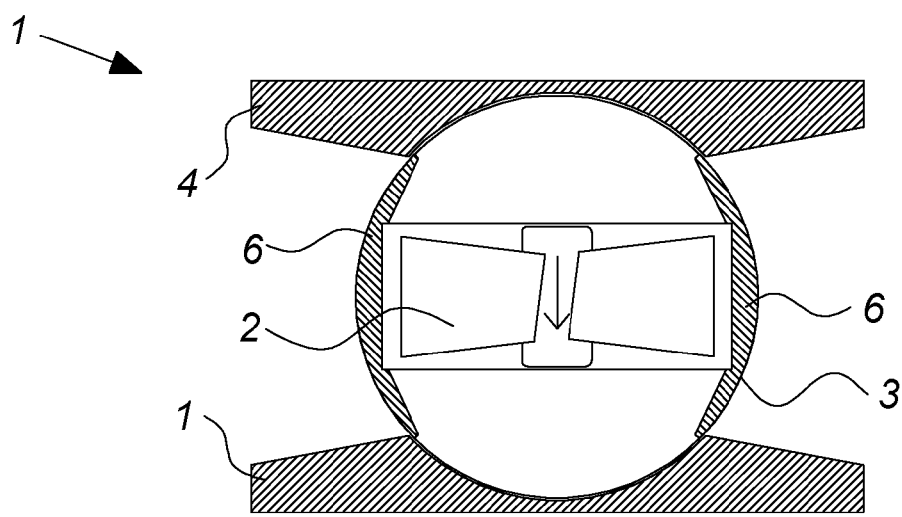
Figure 1C:
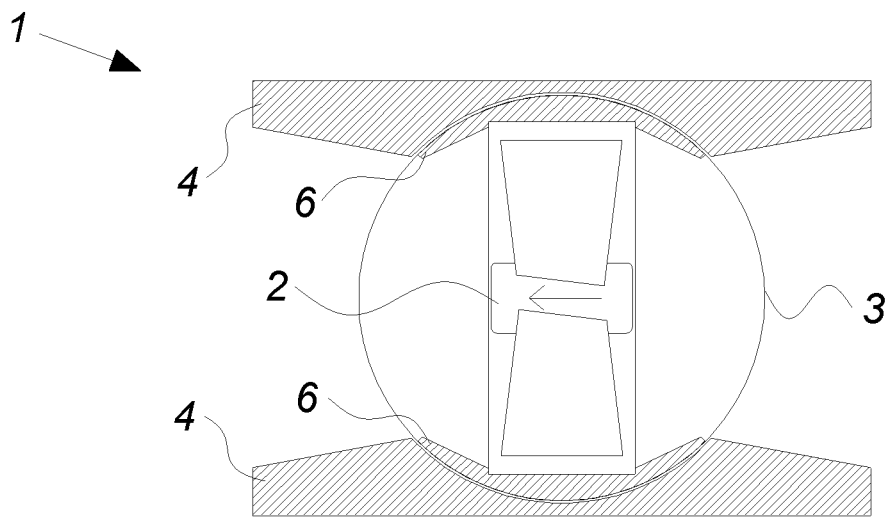
Figure 1D:
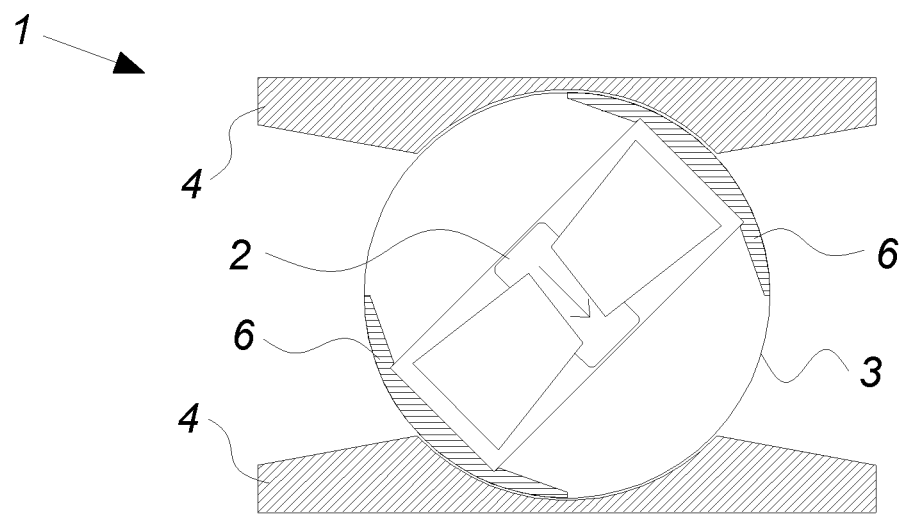
Figure 2:
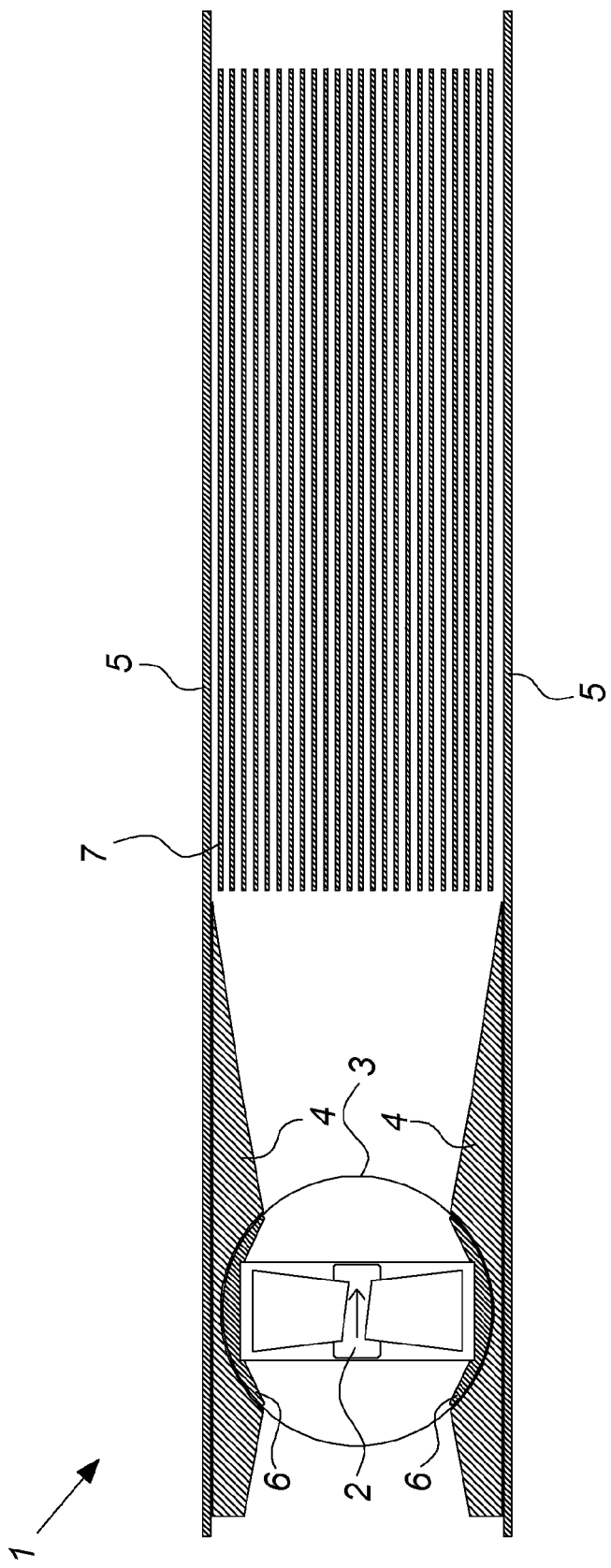
Figure 3:
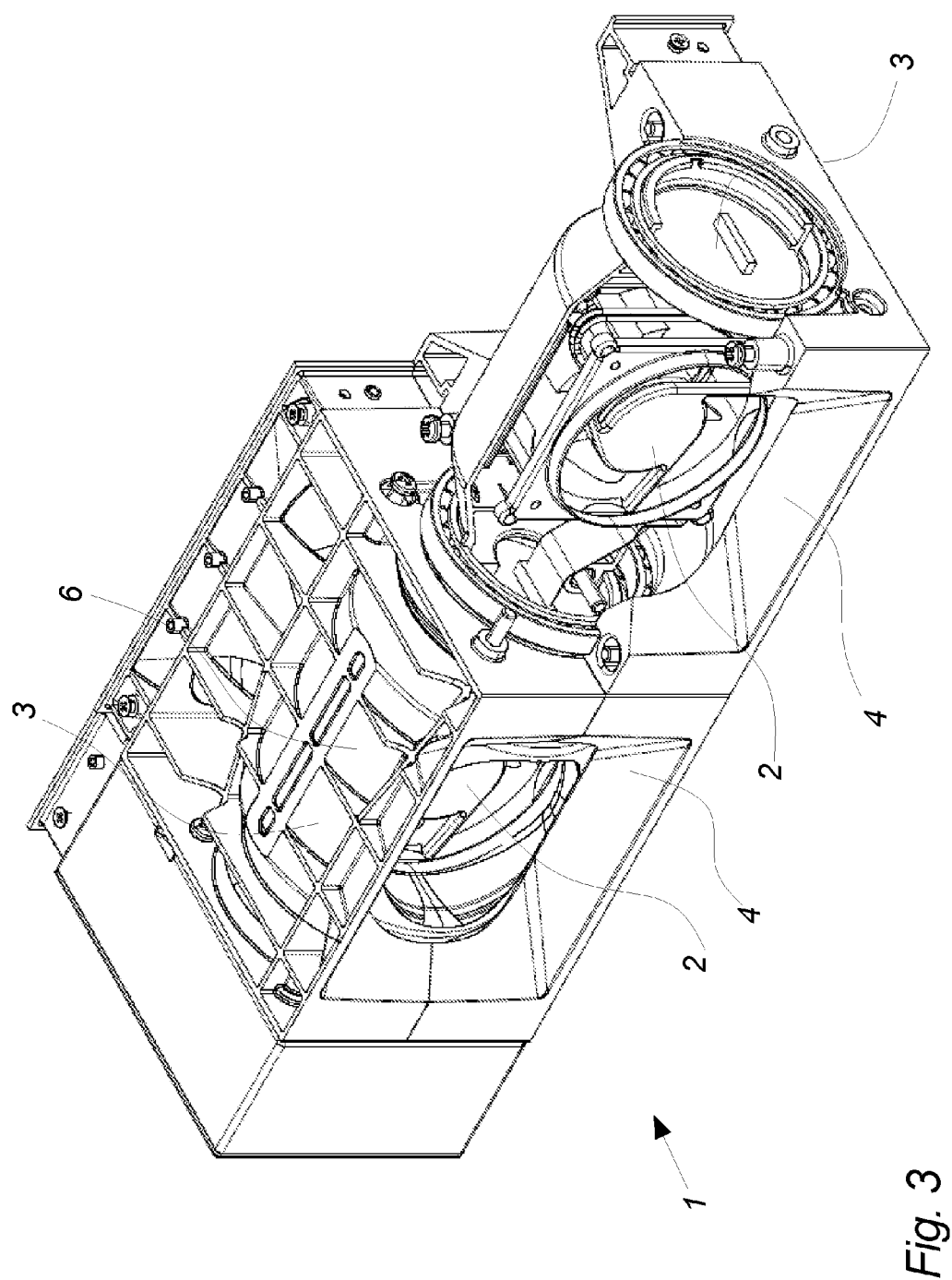

A few exemplary embodiments of the invention will be described in the following with reference to the figures, of which FIGS. 1a-1d schematically illustrate four different rotational positions of an air flow generator of a ventilation system according to an embodiment of the invention, FIG. 2 schematically illustrates a ventilation system comprising a heat storage according to an embodiment of the invention, and FIG. 3 illustrates a perspective view of essential parts of a ventilation system according to an embodiment of the invention.

DETAILED DESCRIPTION OF THE INVENTION

FIGS. 1a-1d schematically illustrate four different rotational positions of an air flow generator 2 of a ventilation system 1 according to an embodiment of the invention.

The air flow generator 2 is arranged in an aperture extending radially through a rotatable cylinder 3, which is mounted in a mounting frame 4 arranged inside a continuous duct 5 (not shown in FIGS. 1a-1d). Two registers 6 are fixedly connected to the air flow generator 2 so that the registers 6 move tangentially when the cylinder 3 and thereby also the air flow generator 2 is rotated about the longitudinal axis of the cylinder 3.

The small arrow in the air flow generator 2 indicates the direction of the air flow generated by the air flow generator 2 when it is active, i.e. when it is running and generating an air flow.

In a first rotational position of the air flow generator 2 as illustrated in FIG. 1a, the air flow generator 2 is positioned to generate a substantially axial air flow through the duct 5 (not shown). The registers 6 are positioned to leave the air passage through the duct 5 substantially fully open.

This first rotational position of the air flow generator 2 is suitable for obtaining controlled active ventilation through the duct 5 by controlling the output of the motor (not shown) driving the air flow generator 2, thereby controlling the air flow generated by the air flow generator 2, so as to obtain the desired ventilation effect.

In a second rotational position of the air flow generator 2 as illustrated in FIG. 1b, the air flow generator 2 has been rotated 90° to be in a position perpendicular to the one in FIG. 1a. The registers 6 have been moved accordingly and are now positioned to block completely the air passage through the duct 5.

FIG. 1c illustrates how a further rotation of the air flow generator 2 by another 90° brings the ventilation system 1 in a mode very similar to the one illustrated in FIG. 1a with the only exception that an air flow generated by the air flow generator 2 will run in the opposite direction.

Thus, the third rotational position of the air flow generator 2 as illustrated in FIG. 1c is also suitable for obtaining controlled active ventilation through the duct 5 like described above.

In FIG. 1d, the air flow generator 2 is in a fourth rotational position, which is somewhere between the first and the second rotational positions as described above. In this case, the registers 6 are partly blocking the air passage through the duct 5.

In such intermediate rotational positions of the air flow generator 2, in which the air passage through the duct 5 is partly blocked, the ventilation system 1 may be used for controlled passive ventilation through the duct 5 by switching off the air flow generator 2 and controlling the positions of the registers 6 by rotating the air flow generator 2, thereby controlling the opening of the air passage through the duct 5, so as to obtain the desired ventilation effect.

FIG. 2 schematically illustrates a ventilation system 1 like the one in FIGS. 1a-1d, further comprising a heat storage 7.

In this figure, it is illustrated how the mounting frame 4 with the rotatable cylinder 3 and the air flow generator 2 is arranged within a continuous duct 5, and how a heat storage 7, which may for instance consist of a number of parallel metal plates between which the air flow must pass, is arranged within the same duct 5.

In this configuration, the ventilation system 1 may be used for heat recovery by first controlling a flow of warm air (by active or passive ventilation as described above) in one direction through the duct 5, during which heat energy from the air flow will be extracted by and stored in the heat storage 7 as the air flow passes through it, and then later controlling a flow of colder air in the opposite direction, during which at least some of the heat energy stored in the heat storage 7 will be absorbed by the colder air passing through the heat storage 7.

FIG. 3 illustrates a perspective view of some of the essential parts of a ventilation system 1 according to an embodiment of the invention. It is seen how the air flow generators 2 in the form of rotating fans are arranged in apertures extending radially through rotatable cylinders 3, and how the registers 6 are formed by the parts of the cylinders 3 surrounding these apertures.

FIG. 3 also illustrates how a number of air flow generators 2 may be combined to be rotated together by arranging the mounting frames 4 in a way so that the rotatable cylinders 3 are connected to each other along a common axis of rotation.

The invention has been exemplified above with reference to specific embodiments of ventilations systems 1, air flow generators 2 and other components. However, it should be understood that the invention is not limited to the particular examples described above but may be designed and altered in a multitude of varieties within the scope of the invention as specified in the claims.

LIST OF REFERENCE NUMBERS

1. Ventilation system
2. Air flow generator
3. Rotatable cylinder
4. Mounting frame
5. Continuous duct
6. Register
7. Heat storage

The invention claimed is:

1. A ventilation system for air ventilation comprising:
   a continuous duct having openings at both ends,
   an air flow generator arranged inside the duct to be rotatable around an axis of rotation so that, positioned in different rotational positions, the air flow generator is capable of producing a substantially axial air flow in each of two directions through the duct, respectively,
   one or more registers arranged to be moveable between different positions, in at least one of which positions the one or more registers leave the duct open for air passage, whereas in another of the positions the one or more registers substantially block the air passage through the duct, wherein the one or more registers are connected to the air flow generator so that they perform a rotational motion when the air flow generator is rotated and
   a motor for simultaneously rotating the air flow generator and positioning the one or more registers.

2. The ventilation system according to claim 1, wherein the one or more registers further can be moved into positions, in which the air passage through the duct is partly blocked.

3. The ventilation system according to claim 1, wherein the axis of rotation of the air flow generator is substantially perpendicular to a longitudinal axis of the duct.

4. The ventilation system according to claim 1, wherein the rotational position of the air flow generator and the positions of the one or more registers are connected in a one-to-one relationship so that, when the air flow generator is in any given rotational position, the one or more registers are in positions associated with that specific rotational position of the air flow generator.

5. The ventilation system according to claim 4, wherein, when the air flow generator is in a rotational position in which it produces a substantially axial air flow through the duct, the one or more registers are in positions leaving the air passage substantially fully open.

6. The ventilation system according to claim 4, wherein, when the air flow generator is in a rotational position perpendicular to the ones in which it produces a substantially axial air flow through the duct, the one or more registers are in positions, in which the air passage through the duct is substantially blocked.

7. The ventilation system according to claim 1, in which the positioning of the one or more registers is stepless.

8. The ventilation system according to claim 4, wherein the one or more registers comprise one or more barrier plates.

9. The ventilation system according to claim 1 further comprising a heat storage.

10. The ventilation system according to claim 1 further comprising a power control for controlling the power output of a motor driving the air flow generator.

11. A method for obtaining controlled active ventilation through the duct of a ventilation system according to claim 10, said method comprising the steps of:
   simultaneously positioning the air flow generator and the one or more registers such that the air flow generator is in a rotational position in which it produces a substantially axial air flow through the duct and the one or more registers are in positions in which the air passage through the duct is left substantially fully open, and
   controlling the output of the motor driving the air flow generator so as to obtain desired ventilation effect.

12. A method for obtaining controlled passive ventilation through the duct of a ventilation system according to claim 1, said method comprising the steps of:
   switching off the air flow generator,
   controlling the positions of the one or more registers, thereby controlling the opening of the air passage through the duct, so as to obtain a desired ventilation effect.

13. A ventilation system for air ventilation comprising:
   a continuous duct having openings at both ends;
   a rotatable cylinder arranged inside the continuous duct, the rotatable cylinder being rotatable around an axis of rotation and comprising an air flow generator and at least one register connected to the air flow generator;
   whereby the rotatable cylinder is rotatable 360 degrees around the axis of rotation such that:
      the air flow generator has at least a first position in which it produces a substantially axial air flow in a first direction through the duct and a second position in which it produces a substantially axial air flow in a second direction through the duct, and a third position in which it produces air flow substantially perpendicular to the length of the duct; and
      the at least one register has at least a first position in which it is positioned to substantially block the passage of air through the duct, a second position in which it is positioned to partially block the passage of air through the duct, and a third position in which it is positioned to leave the duct substantially open for the passage or air.

14. The ventilation system according to claim 13 wherein:
when the air flow generator is positioned in either of its first and second positions, the at least one register is positioned in its third position; and
when the air flow generator is positioned in its third position, the at least one register is positioned in its first position.

15. The ventilation system according to claim 13 wherein the air flow generator is positioned within the rotatable cylinder substantially at the rotatable cylinder's axis of rotation.

\* \* \* \* \*